United States Patent
Zhang et al.

(10) Patent No.: US 10,860,668 B1
(45) Date of Patent: Dec. 8, 2020

(54) QUERYING SYSTEM AND METHOD

(71) Applicant: EMC IP HOLDING COMPANY LLC, Hopkinton, MA (US)

(72) Inventors: Jichao Zhang, Shanghai (CN); James O. Pendergraft, Raleigh, NC (US); Harbee Huijing Wang, Shanghai (CN); Hao Sun, Shanghai (CN); Yuanjie Wu, Shanghai (CN); Chun Wei, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 503 days.

(21) Appl. No.: 15/279,953

(22) Filed: Sep. 29, 2016

(51) Int. Cl.
*G06F 7/00* (2006.01)
*G06F 16/00* (2019.01)
*G06F 16/9535* (2019.01)
*G06F 16/248* (2019.01)
*G06F 16/2455* (2019.01)

(52) U.S. Cl.
CPC ........ *G06F 16/9535* (2019.01); *G06F 16/248* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 2005/0144526 A1* | 6/2005 | Banko | ............... | G06F 11/079 714/38.12 |
| 2007/0038615 A1* | 2/2007 | Vadon | ............... | G06F 40/232 |
| 2010/0293439 A1* | 11/2010 | Flynn | ............... | G06F 11/108 714/763 |
| 2010/0293440 A1* | 11/2010 | Thatcher | ............... | G06F 11/073 714/764 |
| 2011/0055172 A1* | 3/2011 | Tan | ............... | G06Q 10/08 707/692 |
| 2013/0253977 A1* | 9/2013 | Vibhor | ............... | G06Q 10/06316 705/7.26 |
| 2013/0275320 A1* | 10/2013 | Moore | ............... | G06Q 10/1053 705/321 |
| 2014/0244625 A1* | 8/2014 | Seghezzi | ............... | G06F 16/248 707/722 |
| 2014/0365828 A1* | 12/2014 | Jiang | ............... | G06F 11/0709 714/37 |
| 2015/0120748 A1* | 4/2015 | Kraynak | ............... | G06F 16/148 707/741 |
| 2015/0172120 A1* | 6/2015 | Dwarampudi | ............... | G06F 3/06 709/221 |

* cited by examiner

*Primary Examiner* — Tuan A Pham
(74) *Attorney, Agent, or Firm* — Brian J. Colandreo; Mark H. Whittenberger; Holland & Knight LLP

(57) ABSTRACT

A method, computer program product, and computing system for receiving an inquiry for a storage system from a user, wherein the inquiry concerns one or more resources/properties of the storage system. The inquiry is processed to identify one or more unavailability errors, wherein an unavailability error occurs when a resource/property identified within the inquiry is unavailable on the storage system. A database is queried to obtain information on the one or more resources/properties of the storage system, thus generating a search result. The search result is filtered to remove information corresponding to the one or more unavailability errors.

15 Claims, 3 Drawing Sheets

QUERYING SYSTEM AND METHOD

TECHNICAL FIELD

This disclosure relates to querying systems and, more particularly, to querying systems for use with storage systems.

BACKGROUND

Storing and safeguarding electronic content is of paramount importance in modern business. Accordingly, various methodologies may be employed to protect and distribute such electronic content. For example, complex high-availability storage systems may be custom configurable and may include dozens of components & subcomponents. While these storage systems may be managed via user interfaces, as these storage systems are complex and highly configurable, such user interfaces may often provide the user with errors when they try to inquire about resources that are not available on a particular system.

SUMMARY OF DISCLOSURE

In one implementation, a computer-implemented method is executed on a computing device and includes receiving an inquiry for a storage system from a user, wherein the inquiry concerns one or more resources/properties of the storage system. The inquiry is processed to identify one or more unavailability errors, wherein an unavailability error occurs when a resource/property identified within the inquiry is unavailable on the storage system. A database is queried to obtain information on the one or more resources/properties of the storage system, thus generating a search result. The search result is filtered to remove information corresponding to the one or more unavailability errors.

One or more of the following features may be included. A search report may be provided to the user that includes the search result. The information corresponding to the one or more unavailability errors may include information concerning the occurrence of the one or more unavailability errors. The information corresponding to the one or more unavailability errors may include information concerning the resource/property identified within the resource request that is unavailable on the storage system. The one or more resources may include one or more of: a physical resource and a logical resource. A resource/property identified within the inquiry may be unavailable when the resource/property is not present on the storage system. A resource/property identified within the inquiry may be unavailable when the resource/property is not licensed for use on the storage system.

In another implementation, a computer program product resides on a computer readable medium and has a plurality of instructions stored on it. When executed by a processor, the instructions cause the processor to perform operations including receiving an inquiry for a storage system from a user, wherein the inquiry concerns one or more resources/properties of the storage system. The inquiry is processed to identify one or more unavailability errors, wherein an unavailability error occurs when a resource/property identified within the inquiry is unavailable on the storage system. A database is queried to obtain information on the one or more resources/properties of the storage system, thus generating a search result. The search result is filtered to remove information corresponding to the one or more unavailability errors.

One or more of the following features may be included. A search report may be provided to the user that includes the search result. The information corresponding to the one or more unavailability errors may include information concerning the occurrence of the one or more unavailability errors. The information corresponding to the one or more unavailability errors may include information concerning the resource/property identified within the resource request that is unavailable on the storage system. The one or more resources may include one or more of: a physical resource and a logical resource. A resource/property identified within the inquiry may be unavailable when the resource/property is not present on the storage system. A resource/property identified within the inquiry may be unavailable when the resource/property is not licensed for use on the storage system.

In another implementation, a computing system includes a processor and a memory system configured to perform operations including receiving an inquiry for a storage system from a user, wherein the inquiry concerns one or more resources/properties of the storage system. The inquiry is processed to identify one or more unavailability errors, wherein an unavailability error occurs when a resource/property identified within the inquiry is unavailable on the storage system. A database is queried to obtain information on the one or more resources/properties of the storage system, thus generating a search result. The search result is filtered to remove information corresponding to the one or more unavailability errors.

One or more of the following features may be included. A search report may be provided to the user that includes the search result. The information corresponding to the one or more unavailability errors may include information concerning the occurrence of the one or more unavailability errors. The information corresponding to the one or more unavailability errors may include information concerning the resource/property identified within the resource request that is unavailable on the storage system. The one or more resources may include one or more of: a physical resource and a logical resource. A resource/property identified within the inquiry may be unavailable when the resource/property is not present on the storage system. A resource/property identified within the inquiry may be unavailable when the resource/property is not licensed for use on the storage system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
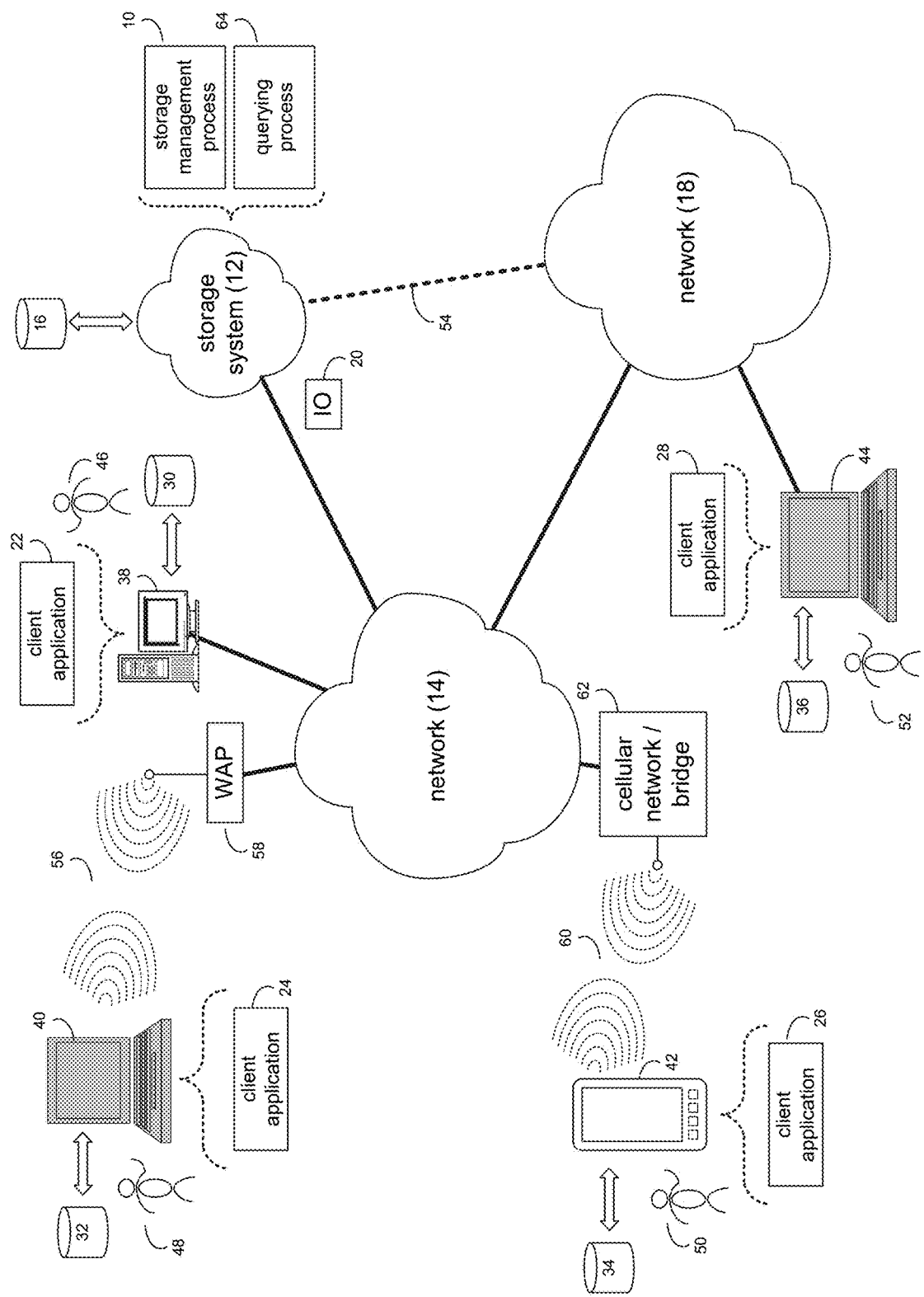
FIG. 1 is a diagrammatic view of a storage system, a querying process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
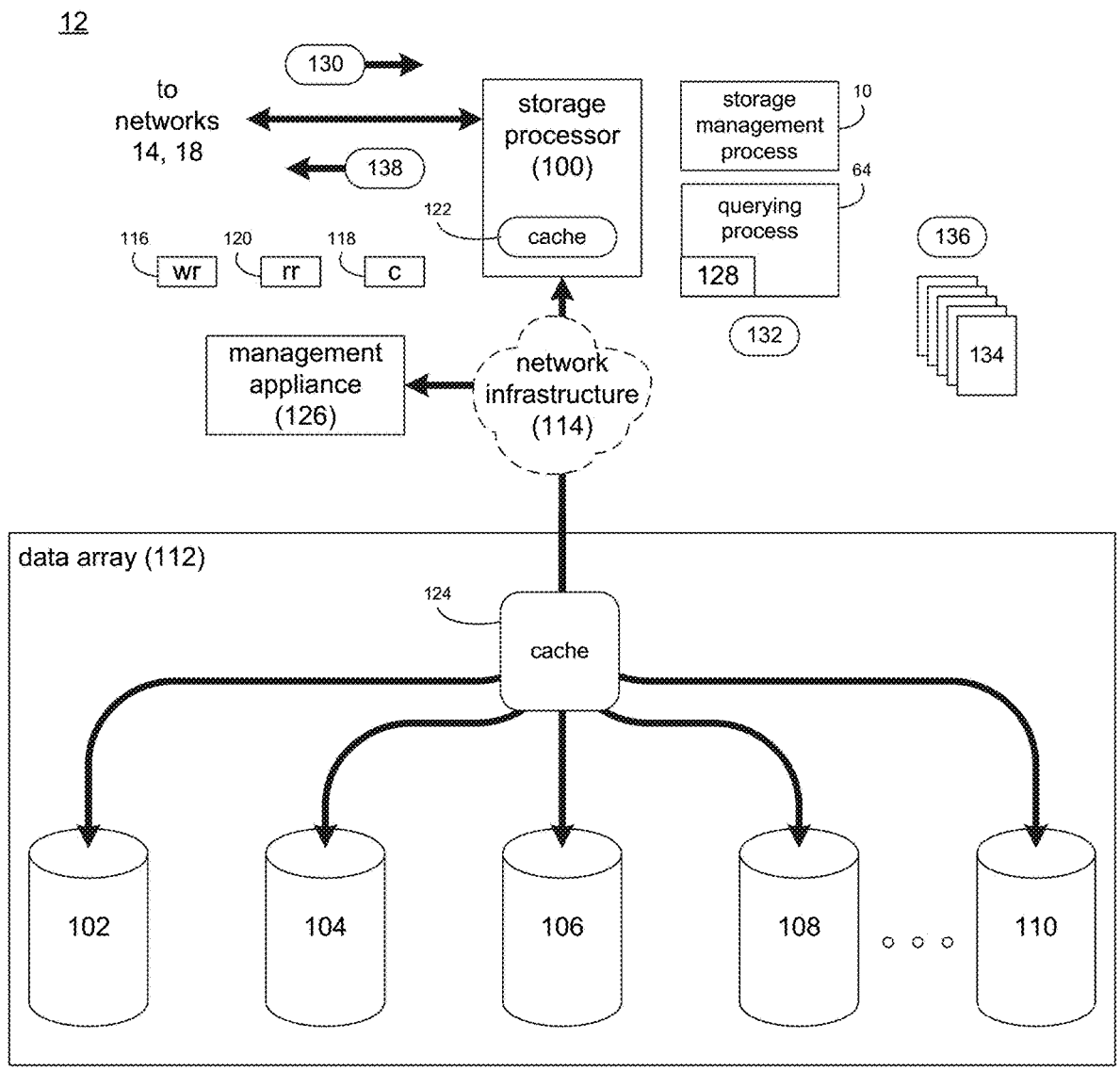
FIG. 2 is a diagrammatic view of the storage system of FIG. 1.

Data Storage System:

Referring also to FIG. 2, there is shown a general and illustrative implementation of storage system 12. In this general and illustrative implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Querying Process:

Storage system 12 may execute all or a portion of querying process 64, wherein querying process 64 may be configured to provide information concerning storage system 12 to one or more of e.g., users 46, 48, 50, 52. Alternatively, querying process 64 may be executed on an external management appliance (e.g., external management appliance 126) that is coupled to storage system 12.

Querying process 64 may be implemented as a server-side process or a hybrid server-side/client-side process. For example, querying process 64 may be implemented as a purely server-side process via querying process 64. Alternatively, querying process 64 may be implemented as a hybrid server-side/client-side process via querying process 64 in combination with one or more of client application 22, client application 24, client application 26 and/or client application 28. Accordingly, querying process 64 as used in this disclosure may include any combination of querying process 64, client application 22, client application 24, client application 26 and client application 28.

The instruction sets and subroutines of querying process 64, which may be stored on a storage device (e.g., storage device 16) coupled to storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

During operation of storage system 12 and through the use of querying process 64, an administrator (e.g., user 46, user 48, user 50 and/or user 52) may inquire (via querying process 64) concerning the availability and status of various resources/properties of storage system 12.

For this example, assume that user 48 is the administrator of storage system 12 and user 48 uses client electronic device 38 and client application 22 to access querying process 64. Assume that client application 22 is a RESTful interface and that querying process 64 is coupled to client application 22 using RESTful API 128. As is known in the art, an application program interface (API) is a set of routines, protocols, and tools that allow external computers/applications (e.g., client electronic device 38 and client application 22) to access and interact with a program (e.g., querying process 64). Further and as is known in the art, representational state transfer (REST) is an architectural style that includes a coordinated set of architectural constraints applied to components, connectors, and data elements within a computing system. Accordingly and when an API conforms to the constraints of REST, those conforming APIs are said to be RESTful APIs.

Figure 3:
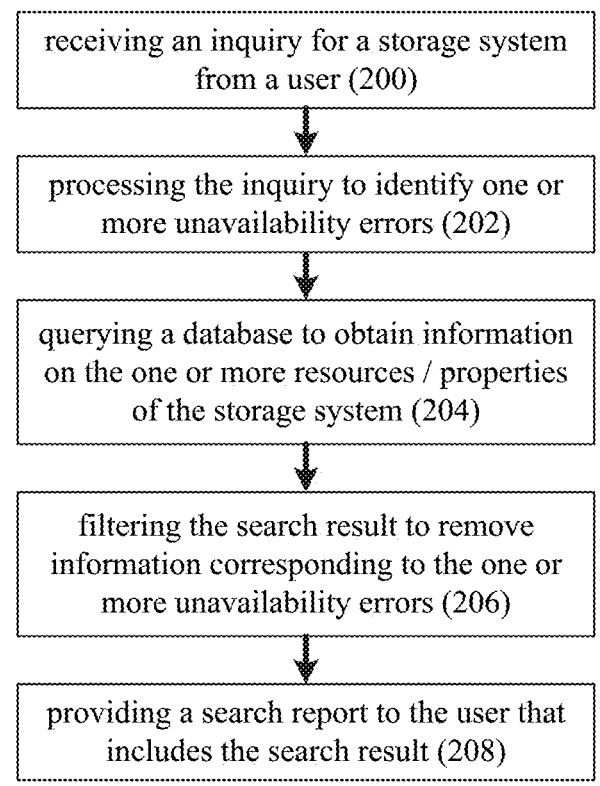
FIG. 3 is a flow chart of the querying process of FIG. 1.

Referring also to FIG. 3, querying process 64 may receive 200 an inquiry (e.g., inquiry 130) for a storage system (e.g., storage system 12) from a user (e.g., user 48), wherein inquiry 130 concerns one or more resources/properties of storage system 12.

The one or more resources defined within inquiry 130 may include but are not limited to one or more of a physical resource and a logical resource. Examples of physical resources may include but are not limited to physical components of (in this example) storage system 12, such as discrete disk drives, RAID controllers, network interfaces, power supplies, host bus adapters and compute modules. Examples of logical resources may include but are not limited to logical components of (in this example) storage system 12, such as LUNs and storage pools.

The one or more properties defined within inquiry 130 may include but are not limited to individual pieces of information concerning a resource (be it a physical resource or a logical resource). For example, if the resource is a RAID array, a property of the resource may be the number of disks in the raid array, the RAID level of the RAID array, and the health (e.g., normal operation mode, degraded operation mode) of the RAID array. If the resource is a hard disk drive, a property of the resource may include the serial number of the hard disk drive, the SMART data of the hard disk drive, and the operating temperature of the hard disk drive.

Querying process 64 may process 202 inquiry 130 to identify one or more unavailability errors (e.g., unavailability errors 132), wherein an unavailability error may occur when a resource/property identified within inquiry 130 is unavailable on storage system 12. A resource/property may be considered unavailable when a) the resource/property is not present on storage system 12 or b) when the resource/property is not licensed for use on storage system 12.

For example, if the resource defined within inquiry 130 is a hard disk drive and storage system 12 include only solid state drives, the hard disk drive resource would be considered unavailable. Further, if the resource defined within inquiry 130 is a backup utility and this backup utility resource is not licensed for use with storage system 12, this backup utility resource would be considered unavailable. Additionally, if storage system 12 were a virtualized storage system (e.g., The Unity VSA™ system offered by Dell EMC of Hopkinton, Mass.), there would be no physical resources associated with it (as it is a virtualized system). Accordingly, if the resource defined within inquiry 130 is a physical component (such as a hard disk drive), this physical component resource would be considered unavailable.

Assume for the following example that storage system 12 is a storage system that includes only solid state (i.e., flash) storage devices and does not include any rotating media (i.e., hard disk drives). Further assume that inquiry 130 is a general purpose inquiry that inquirers about every possible resource and every possible property that may be included within/defined within storage system 12. Accordingly, when querying process 64 processes 202 inquiry 130, unavailability errors will occur because resources and properties will be unavailable.

Specially and for this example, assume that inquiry 130 inquires about hard disk drives within storage system 12 (which do not exist and are, therefore, unavailable) and inquires about the SMART data concerning these hard disk drives (which does not exist and is, therefore, unavailable). Accordingly and when querying process 64 processes 202 inquiry 130, unavailability errors 132 will be identified for the above-described inquiries, because the hard disk drive resource will be unavailable, as will the SMART data property associated with this hard disk drive resource.

Additionally, querying process 64 will not abort this inquiry procedure, querying process 64 will continue to process inquiry 130 and querying process 64 will not report unavailability errors 132 to user 48 (the user that generated inquiry 130).

Accordingly, querying process 64 may query 204 a database (e.g., database 134) to obtain information on resources and/or properties of storage system 12, thus generating a search result (e.g., search result 136). Within search result 136 may be data concerning every resource and/or property identified within inquiry 130. As discussed above, since inquiry 130 is a general purpose inquiry that (in this example) inquirers about every possible resource and every possible property that may be included within/defined within storage system 12, some of the resources and/or properties defined within inquiry 130 will not exist/will be unavailable with respect to storage system 12. Accordingly, search result 136 may include one or more "null" values. As is known in the art, a "null" value is an undefined value and does not have a quantity associated with it. So continuing with the above-stated example, search result 136 may define a <null> for any hard disk drive resource and may define a <null> for any SMART data properties associated with the hard disk drive resource.

Querying process 64 may filter 206 search result 136 to remove any information corresponding to unavailability errors 130. As discussed above, unavailability errors 132 may concern a resource/property that is not present on storage system 12 or a resource/property that is not licensed for use on storage system 12.

Accordingly, querying process 64 may filter 206 search result 136 to remove any resources or properties that defined a <null> value. So for this example, query process 64 may filter 206 research result 136 to remove e.g., the resource "hard disk drives=<null>" entry within search result 136 and the property "SMART data=<null>" entry within search result 136.

Once filtered 206, querying process 64 may provide 208 search report 138 that includes search result 136 to user 46, wherein any information that corresponds to unavailability errors 132 has been filtered 206, thus providing a more concise and easy to read search report 138. Search report 138 may be rendered on a display screen associated with client electronic device 38.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving an inquiry for a storage system from a user, wherein the inquiry concerns one or more resources of a plurality of resources or one or more properties of the plurality of resources of the storage system, wherein the plurality of resources include one or more storage devices, one or more RAID controllers, one or more network interfaces, and one or more compute modules;

processing the inquiry to identify one or more unavailability errors, wherein an unavailability error is generated when at least one resource or property of the one or more resources and the one or more of properties identified within the inquiry is unavailable on the storage system during processing of the inquiry, thus defining at least one unavailable resources or properties, wherein the at least one resource or property identified within the inquiry is unavailable when the at least one resource or property is one or more of: not present on the storage system and not licensed for use on the storage system;

querying a database to obtain information on the one or more resources or properties of the storage system included in the inquiry, thus generating a search result, wherein the search result is configured to include one or more entries that include a null value for each of the at least one unavailable resources or properties;

filtering the search result to remove information corresponding to the at least one unavailable resources or properties from the search result, wherein filtering the search result includes removing the one or more entries that include the null value from the search result; and preventing the storage system from reporting the one or more unavailability errors identified while processing the inquiry, to the user.

2. The computer-implemented method of claim 1 further comprising:
providing a search report to the user that includes the search result.

3. The computer-implemented method of claim 1 wherein the information corresponding to the one or more unavailability errors includes:
information concerning an occurrence of the one or more unavailability errors.

4. The computer-implemented method of claim 1 wherein the information corresponding to the one or more unavailability errors includes:
information concerning the resource or property identified within the resource request that is unavailable on the storage system.

5. The computer-implemented method of claim 1 wherein the one or more resources includes one or more of: a physical resource and a logical resource.

6. A computer program product residing on a non-transitory computer readable medium having a plurality of instructions stored thereon which, when executed by a processor, cause the processor to perform operations comprising:
receiving an inquiry for a storage system from a user, wherein the inquiry concerns one or more resources of a plurality of resources or one or more properties of the plurality of resources of the storage system, wherein the plurality of resources include one or more storage devices, one or more RAID controllers, one or more network interfaces, and one or more compute modules;

processing the inquiry to identify one or more unavailability errors, wherein an unavailability error is generated when at least one resource or property of the one or more resources and the one or more of properties identified within the inquiry is unavailable on the storage system during processing of the inquiry, thus defining at least one unavailable resources or properties, wherein the at least one resource or property identified within the inquiry is unavailable when the at least one resource or property is one or more of: not present on the storage system and not licensed for use on the storage system;

querying a database to obtain information on the one or more resources or properties of the storage system included in the inquiry, thus generating a search result, wherein the search result is configured to include one or more entries that include a null value for each of the at least one unavailable resources or properties;

filtering the search result to remove information corresponding to the at least one unavailable resources or properties from the search result, wherein filtering the search result includes removing the one or more entries that include the null value from the search result; and preventing the storage system from reporting the one or more unavailability errors identified while processing the inquiry, to the user.

7. The computer program product of claim 6 further comprising:
providing a search report to the user that includes the search result.

8. The computer program product of claim 6 wherein the information corresponding to the one or more unavailability errors includes:
information concerning an occurrence of the one or more unavailability errors.

9. The computer program product of claim 6 wherein the information corresponding to the one or more unavailability errors includes:
information concerning the resource or property identified within the resource request that is unavailable on the storage system.

10. The computer program product of claim 6 wherein the one or more resources includes one or more of: a physical resource and a logical resource.

11. A computing system including a hardware processor and hardware memory configured to perform operations comprising:
receiving an inquiry for a storage system from a user, wherein the inquiry concerns one or more resources of a plurality of resources or one or more properties of the plurality of resources of the storage system, wherein the plurality of resources include one or more storage devices, one or more RAID controllers, one or more network interfaces, and one or more compute modules;

processing the inquiry to identify one or more unavailability errors, wherein an unavailability error is generated when at least one resource or property of the one or more resources and the one or more of properties identified within the inquiry is unavailable on the storage system during processing of the inquiry, thus defining at least one unavailable resources or properties, wherein the at least one resource or property identified within the inquiry is unavailable when the at least one resource or property is one or more of: not present on the storage system and not licensed for use on the storage system;

querying a database to obtain information on the one or more resources or properties of the storage system included in the inquiry, thus generating a search result, wherein the search result is configured to include one or more entries that include a null value for each of the at least one unavailable resources or properties;

filtering the search result to remove information corresponding to the at least one unavailable resources or properties from the search result, wherein filtering the search result includes removing the one or more entries that include the null value from the search result; and preventing the storage system from reporting the one or more unavailability errors identified while processing the inquiry, to the user.

12. The computing system of claim 11 further configured to perform operations comprising:

providing a search report to the user that includes the search result.

13. The computing system of claim 11 wherein the information corresponding to the one or more unavailability errors includes:

information concerning an occurrence of the one or more unavailability errors.

14. The computing system of claim 11 wherein the information corresponding to the one or more unavailability errors includes:

information concerning the resource or property identified within the resource request that is unavailable on the storage system.

15. The computing system of claim 11 wherein the one or more resources includes one or more of: a physical resource and a logical resource.

* * * * *